A. KNELL, Jr.
DEVICE FOR PREVENTING THEFT OF AUTOMOBILES.
APPLICATION FILED MAR. 8, 1919.
1,313,544.
Patented Aug. 19, 1919.
2 SHEETS—SHEET 1.
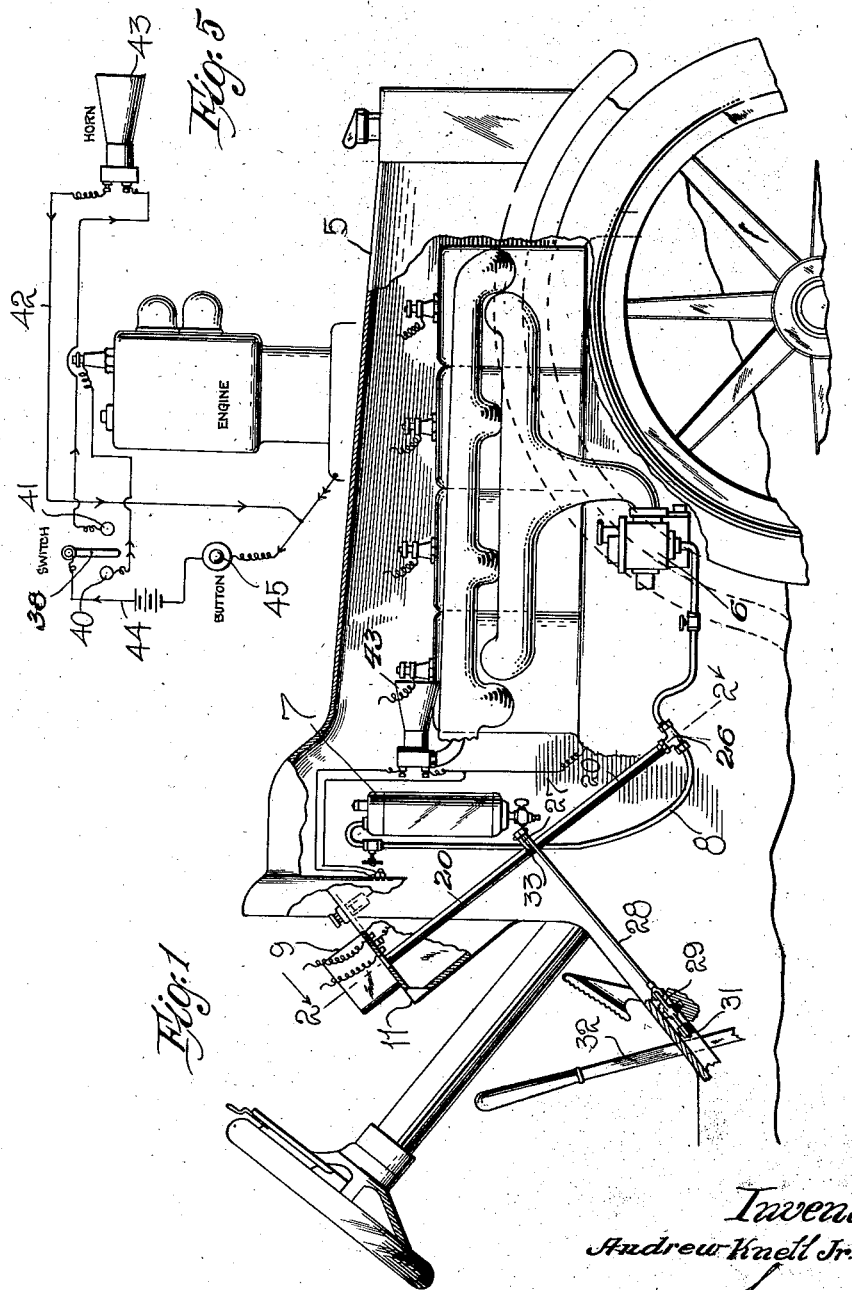

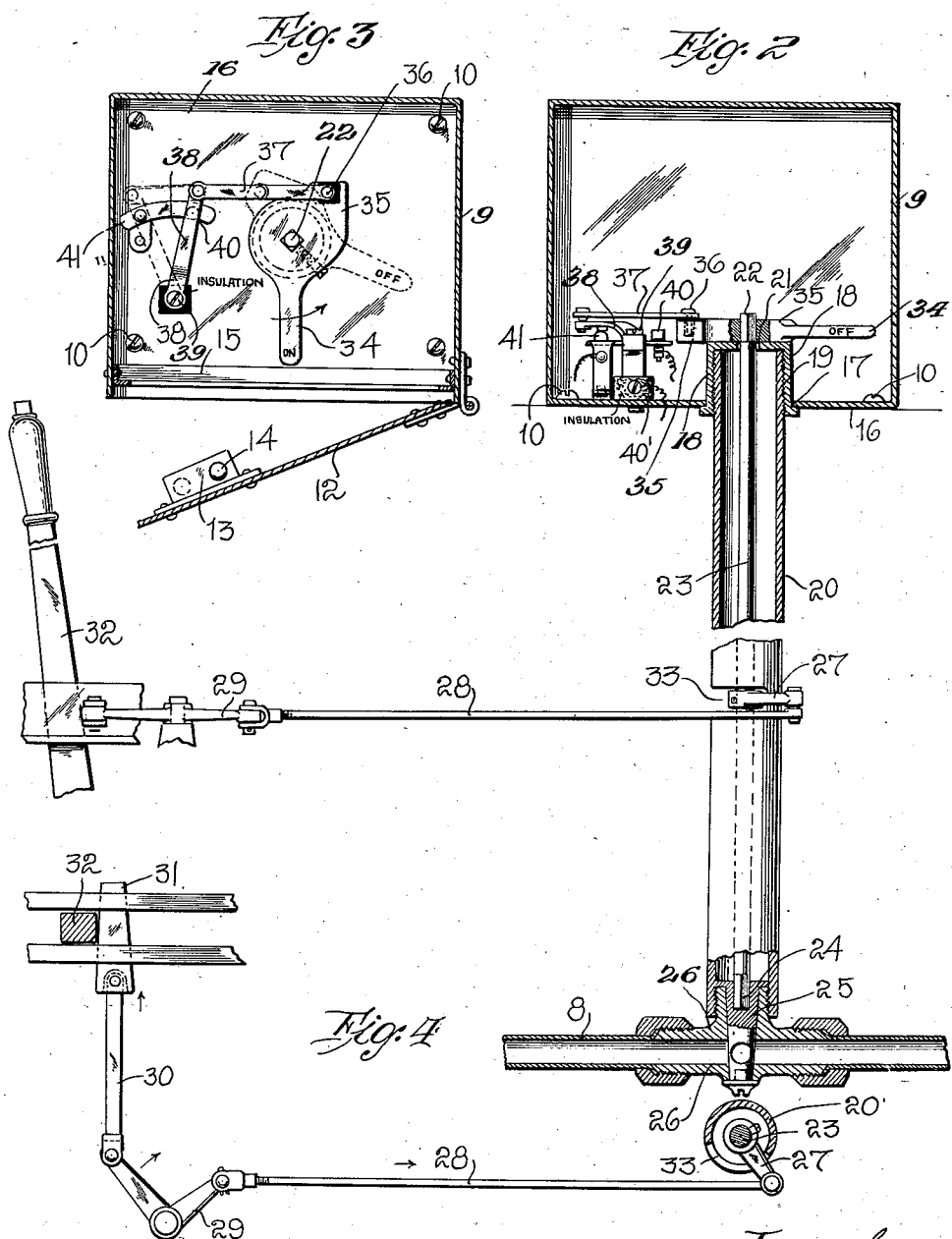

UNITED STATES PATENT OFFICE.

ANDREW KNELL, JR., OF BALTIMORE, MARYLAND.

DEVICE FOR PREVENTING THEFT OF AUTOMOBILES.

1,313,544.  Specification of Letters Patent.  Patented Aug. 19, 1919.

Application filed March 8, 1919. Serial No. 281,372.

*To all whom it may concern:*

Be it known that I, ANDREW KNELL, Jr., a citizen of the United States, residing at Baltimore, and State of Maryland, have invented certain new and useful Improvements in Devices for Preventing Theft of Automobiles, of which the following is a specification.

This invention relates to safety devices for automobiles, trucks and similar self-propelled vehicles and has for its object to provide a comparatively simple and thoroughly efficient device of this character which will render it practically impossible for an unauthorized person to surreptitiously steal an automobile in the owner's absence.

The invention contemplates the provision of a metal box or casing adapted to be mounted on the dash or other suitable portion of an automobile and having a lever arranged therein and operatively connected with the gasolene supply to the carbureter and also with the emergency brake, so that when said lever is turned in one direction the supply of gasolene will be cut off and the emergency lever locked in braking position and when said lever is turned in the opposite direction the emergency brake will be released and gasolene permitted to flow to the carbureter.

A further object is to provide the box or casing with a swinging door or closure having a lock mounted thereon so that access may be had to the operating lever only by the holder of the key to the said box, and further to so construct the box as to render it difficult if not impossible for an unauthorized person to pry open the closure in an attempt to obtain access to said operating lever.

A still further object of the invention is generally to improve this class of devices so as to increase their utility, durability and efficiency.

In the accompanying drawings:

Figure 1 is a side elevation partly in section, of an automobile equipped with a safety device embodying the present invention;

Fig. 2 is a vertical sectional view taken on the line 2—2 of Fig. 1;

Fig. 3 is a top plan view with the top or cover removed and showing the swinging door or closure in partially open position;

Fig. 4 is a transverse sectional view showing the connection between the actuating rod and locking pawl of the emergency brake;

Fig. 5 is a diagrammatic view of the alarm and ignition circuits.

Corresponding and like parts are referred to in the following description and indicated in all the views of the accompanying drawings by the same reference characters.

The improved safety device forming the subject matter of the present invention may be applied with equally good results to automobiles, trucks and other self-propelled vehicles and by way of illustration is shown in connection with an automobile of the ordinary construction, in which 5 designates the hood, 6 the carbureter, 7 the vacuum gasolene feed tank and 8 the gasolene supply pipe leading from the tank 7 to the carbureter 6.

The device comprises a metallic casing 9 preferably substantially rectangular in shape, as shown, and secured by screws or similar fastening devices 10 to the dash 11 or to any other convenient portion of the automobile. The box or casing 9 is provided with a pivoted door or closure 12 having a lock 13 secured to the inner face thereof, the bolts 14 of said lock being preferably arranged in a vertical plane and adapted to engage with retaining flanges 15 secured to the inner walls of the box or casing at the top and bottom thereof, as shown. The construction of the retaining flanges 15 is such as to effectually prevent an unauthorized person from introducing a chisel or other tool between the closure 12 and the adjacent wall of the box in an attempt to pry or force the closure 12 open when the latter is locked in closed position.

Formed in the bottom 16 of the box or casing is an opening 17 and fitted in said opening and rigidly secured to the box is a cap 18 the interior walls of which are threaded at 19 for engagement with the correspondingly threaded end of a tubular casing 20. The top of the cap 18 is provided with an opening 21 through which passes the squared end 22 of an actuating rod 23. The lower end of the actuating rod 23 is provided with a squared terminal 24 which fits within the correspondingly squared terminal of a turning plug or valve 25, the latter being seated in a casing 26 connected in the fuel supply pipe 8, as best shown in Fig. 2 of the drawings. It will thus be seen that by turning the rod 23 the valve 25 may be operated to control the flow of gasolene from the tank 7 to the carbureter 6.

Secured to the intermediate portion of the rod 23 and preferably disposed at right angles thereto is a crank arm 27 to which is connected one end of a rod 28 the opposite end of which is connected to the short arm of a bell crank lever 29. Secured to the long arm of the bell crank lever 29 is one end of a link 30 the opposite end of which is pivotally connected to a locking pawl 31. The locking pawl 31 is movable into the path of the emergency brake lever 32 so that when the rod 23 is turned or rotated in one direction the pawl 31 will be moved to a position into the path of the emergency lever 32 and lock the latter from further movement. Conversely, when the rod 23 is rotated in the opposite direction the pawl 31 will be withdrawn from the emergency lever 32 and thus permit the latter to be actuated in the usual manner. The casing 20 is provided with a segmental slot 33 which accommodates the crank arm 27 and thus permits movement of said crank arm without interference.

Secured to the squared end 22 of the actuating rod 23 is an operating lever 34 provided with a lateral offset or extension 35 to which is pivotally connected, at 36, one end of a connecting link 37 the opposite end of which is pivotally connected to a switch blade indicated at 38. The switch blade 38 is pivotally mounted at 39 on a block of insulating material 40' and is movable laterally within the box 9 so as to engage one or the other of spaced contacts 40 and 41 also arranged within the box or casing. The contacts 40 and 41 are connected to the terminals of an alarm circuit 42 including an audible signal 43 preferably in the form of a horn having a distinctive tone or sound so as to attract attention.

The ignition circuit is indicated at 44 and includes the usual battery and switch button 45, said ignition circuit being connected with the alarm circuit, as shown, so that when the switch 38 is moved into engagement with the contact 41 and the ignition switch button 45 is depressed, the audible signal 43 will sound and continue to sound until the circuit is interrupted by releasing the button 45.

Under normal conditions the operating lever 34 and its associated parts are in the position shown in full lines in Fig. 3 of the drawings. When the operator leaves the car for a predetermined time he opens the closure 12 and moves the lever 34 to the dotted line position shown in Fig. 3 of the drawings and in doing so rotates the actuating rod 23 thereby closing the valve 25 and cutting off the supply of fuel to the carbureter and simultaneously moving the locking pawl in the path of the emergency brake lever so as to prevent the release thereof. As the lever 34 is moved in the direction of the arrow indicated in Fig. 3 of the drawings, the link 37 will move the switch blade 38 into engagement with the contact 41 and thus connect the audible alarm 43 in circuit with the ignition system. Should an unauthorized person now attempt to start the machine by pressing the ignition switch button 45 the circuit will be closed through the alarm and thereby cause the horn to sound and continue to sound until the switch 45 is released, thereby frightening the thief and at the same time notifying the authorities, by reason of the peculiar characteristic tone of the alarm, that an attempt is being made to steal the car. Moreover, in order for such unauthorized person to start the car it would be necessary for him to either have the key to the lock 13 or else pry open the lock and move the lever 34 to the full line position shown in Fig. 3 of the drawings. It will thus be seen that not only is an alarm sounded in case an unauthorized person closes the ignition switch and attempts to steal the car, but that the safety of the machine is further safeguarded owing to the arrangement of the operating lever within the box or casing and the lock provided on the door or closure of said casing.

In order to start the car it is merely necessary for the owner thereof to insert the key in the lock 13, open the door 12 and move the lever 34 to the full line position shown in Fig. 3 of the drawings, which operation actuates the rod 23 to open the valve in the fuel supply pipe and at the same time withdraw the locking pawl from the emergency brake. When this is done the switch blade 38 will be moved into engagement with the contact 40 thereby cutting out the audible alarm 43 and connecting the switch 45 in the ignition system, in the usual manner, so that when the switch 45 is operated to close the circuit the horn 43 will remain dormant or silent.

While the tubular member 20 and rod 23 are shown extended through the back of the box or casing it will of course be understood that said parts may be extended through the bottom of the casing and in order that this may be accomplished the bottom of said box or casing is preferably provided with an opening to receive the parts.

Having thus described the invention, what is claimed as new is:

1. In an automobile, the combination with a fuel supply valve and a brake lever, of an actuating rod operatively connected with the valve, a locking pawl movable into the path of the brake lever, a connection between the locking pawl and the actuating rod, and an operating lever connected with the rod for actuating the latter to simultaneously close the fuel supply valve and move the locking pawl to operative position.

2. In an automobile, the combination with a fuel supply valve and an emergency brake lever, of an energized ignition circuit including a switch, a casing, a tubular member depending from the casing, an actuating rod extending through the tubular member and operatively connected with the valve, a locking pawl movable into the path of the emergency brake lever, a connection between the rod and locking pawl, an operating lever secured to the upper end of the rod and provided with an offset portion, and a link forming a connection between said switch and the offset portion of the lever.

3. In an automobile, the combination with a fuel supply valve, a brake lever, and an energized ignition circuit including a switch; of actuating means connected with the fuel supply valve, locking means movable in the path of the brake lever, a connection between said two means, an operating lever secured to the actuating means, and a connection between the operating lever and switch whereby when the operating lever is turned in one direction the fuel supply valve will be closed, the brake lever locked and the switch actuated to open the ignition circuit.

4. In an automobile, the combination with a fuel supply valve and an emergency brake lever, of a casing, a tubular member depending from the casing, an actuating rod disposed within the casing and operatively connected with the valve, a locking pawl movable into the path of the emergency brake lever, a connection between the locking pawl and the actuating rod, and an operating lever disposed within the casing and connected with the upper end of the actuating rod for rotating the latter to simultaneously close the fuel supply valve and move the locking pawl to operative position.

5. In an automobile, the combination with a fuel supply valve and an emergency brake lever, of a casing, a tubular member depending from the casing and provided with a slot, an actuating rod arranged within the tubular member and operatively connected with the valve, a crank arm secured to the actuating rod and operating within the slot in the tubular member, a locking pawl movable into the path of the emergency brake lever, a rod forming a connection between the crank arm and locking pawl, and an operating lever disposed within the casing and connected with the upper end of the rod for turning the latter to simultaneously close the valve and move the locking pawl to operative position.

6. In an automobile, the combination with a fuel supply valve and an emergency brake lever, of a casing, a cap disposed within the casing, a tubular member threaded in the cap, an actuating rod disposed within the tubular member and having its upper end extending through the top of the cap and its lower end operatively connected with the valve, a locking pawl, a connection between the locking pawl and actuating rod, and an operating lever secured to the upper end of the rod and bearing against the cap for simultaneously closing the valve and moving the locking pawl to operative position.

7. In an automobile, the combination with a fuel supply valve and an emergency brake lever, of a casing having a pivoted closure, a tubular member extending through one wall of the casing and having its lower end engaging the valve casing, an actuating rod extending through the tubular member and connected with the valve, a locking pawl, a crank arm carried by the rod, a bell crank lever having its long arm connected with the locking pawl, a rod forming a connection between the short arm of the bell crank lever and said crank arm, an operating lever disposed within the casing and connected with the upper end of the rod for turning the rod to simultaneously close the valve and move the locking pawl to operative position, and means for locking the closure in closed position.

8. In an automobile, the combination with a fuel supply valve and an emergency brake lever, of a casing having an inwardly extending retaining flange secured to the interior wall thereof, a pivoted closure for the casing adapted to bear against said flange, a tubular member depending from the casing, an actuating rod extending through the tubular member and operatively connected with the valve, a locking pawl movable into the path of the emergency brake lever, a connection between the locking pawl and the actuating rod, and an operating lever connected with the upper end of the rod for rotating the rod to simultaneously close the valve and move the locking pawl to operative position.

In testimony whereof I affix my signature.

ANDREW KNELL, Jr. [l. s.]